(12) United States Patent
Achtenhagen et al.

(10) Patent No.: US 6,801,308 B2
(45) Date of Patent: Oct. 5, 2004

(54) METHOD AND APPARATUS FOR MEASURING CHROMATIC DISPERSION IN OPTICAL FIBERS

(75) Inventors: Martin Achtenhagen, Mönchweiler (DE); Idan Mandelbaum, Raritan, NJ (US); Maxim Bolshtyansky, East Windsor, NJ (US)

(73) Assignee: JDS Uniphase, Inc., San Jose, CA (US)

( * ) Notice: Subject to any disclaimer, the term of this patent is extended or adjusted under 35 U.S.C. 154(b) by 0 days.

(21) Appl. No.: 10/369,664

(22) Filed: Feb. 21, 2003

(65) Prior Publication Data

US 2003/0151736 A1 Aug. 14, 2003

Related U.S. Application Data

(63) Continuation-in-part of application No. 09/909,793, filed on Jul. 23, 2001.
(60) Provisional application No. 60/291,985, filed on May 21, 2001.

(51) Int. Cl.[7] .................................................. G01N 21/00
(52) U.S. Cl. ........................................................ 356/73.1
(58) Field of Search ............................ 356/73.1; 385/42, 385/24, 12, 122; 398/9–33

(56) References Cited

U.S. PATENT DOCUMENTS

| | | | |
|---|---|---|---|
| 5,189,483 A | 2/1993 | Inagaki | ...................... 356/73.1 |
| 5,532,868 A | * 7/1996 | Gnauck et al. | ............. 359/332 |
| 5,724,126 A | * 3/1998 | Nishi et al. | ................. 356/73.1 |
| 6,307,984 B1 | * 10/2001 | Watanabe | ..................... 385/24 |
| 6,477,300 B2 | * 11/2002 | Watanabe et al. | ............. 385/42 |

FOREIGN PATENT DOCUMENTS

JP 2-281122 11/1990

OTHER PUBLICATIONS

"Novel Technique for Group Velocity Dispersion Measurements in Optical Fibers", Idan Mandelbaum et al., IEEE Photonics Technology Letters, vol. 14, No. 3, Mar. 2002, pp. 349–351.

* cited by examiner

Primary Examiner—Tu T. Nguyen
(74) Attorney, Agent, or Firm—Hall, Myers, Vande Sande & Pequignot

(57) ABSTRACT

An apparatus for measuring chromatic dispersion in a waveguide uses a probe signal and a modulated pump signal which are coupled together into a waveguide. The modulated pump signal causes spatial and temporal Raman gain modulation of the probe signal. The amplitude of the pump signal is modulated and the frequency response of the probe signal at the output end of the waveguide is measured. The chromatic dispersion of the waveguide at a given wavelength is determined from the measurements. The probe signal is provided by a CW laser or corresponds to the ASE generated by the pump signal.

20 Claims, 4 Drawing Sheets

METHOD AND APPARATUS FOR MEASURING CHROMATIC DISPERSION IN OPTICAL FIBERS

CROSS-REFERENCE TO RELATED APPLICATIONS

This application is a continuation-in-part of U.S. patent application Ser. No. 09/909,793 filed on Jul. 23, 2001 and claiming priority from U.S. Provisional Appl. No. 60/291,985 filed May 21, 2001.

TECHNICAL FIELD

The present application relates to a method and apparatus for measuring chromatic dispersion in optical waveguides for optical communication, and more specifically to such method and apparatus using Raman effect.

BACKGROUND OF THE INVENTION

Chromatic dispersion occurs in optical waveguides due to differences of propagation speeds at various wavelengths. Therefore, the optical pulse signal expands as it travels along the waveguide, deforming the waveform and causing crosstalk between adjacent channels.

It is desirable to measure the chromatic dispersion in optical waveguides in order to provide proper dispersion compensation. Various methods of measuring chromatic dispersion in optical fibers have been proposed.

In U.S. Pat. No. 4,752,125 two types of optical pulses having different wavelengths are transmitted through an optical fiber. The group velocity delay time is measured as the flight time difference between the two optical pulses. The total amount group velocity dispersion, or chromatic dispersion, is measured from the group velocity delay time and the wavelength difference.

In U.S. Pat. No. 5,189,483, Inagaki describes another pulse delaying method based on transmitting a laser pulse generated by Raman oscillation through a sample fiber. At the output end of the fiber, a reference wavelength light and an object wavelength light are received and a delay time of the object wavelength light relative to the reference wavelength light is measured as a factor of a chromatic dispersion of the sample fiber. Notably, the Raman gain takes place in the measuring instrument, and not in the waveguide under test.

Other than the above described time-of-flight techniques, other methods of measuring chromatic dispersion include the soliton method and the interferometer method. More commonly, chromatic dispersion is measured by determining the phase shift of a modulated signal transmitted along an optical fiber. There are two phase-shift methods used for measuring chromatic dispersion. In the first method, an input signal is modulated and is transmitted through the optical fiber for which chromatic dispersion is to be measured. The phase of the transmitted signal is compared to the phase of a fixed reference signal, which for example, may have been simultaneously transmitted through the fiber or may have been used to modulated the input signal. The phase difference of different input wavelengths relative to the fixed reference wavelength provides the group velocity delay, which is subsequently used to calculate the chromatic dispersion. In the second phase shift method, commonly referred to as the differential phased shift method, the dispersion is measured directly, without calculating the group velocity delay. In particular, the dispersion is calculated from a the phase difference between a first modulated signal at a first wavelength and a second modulated signal at a second wavelength. The phase differences are obtained using electronic phase detectors.

Phase-shift methods are advantageously more accurate. Moreover, a simple filter or monochromator can be used as a wavelength selector. Disadvantageously, phase shift methods require communication between the input and output ends of the device under test (DUT) (e.g., the optical fiber). It is desirable to measure chromatic dispersion without requiring phase information, i.e. without extracting phase properties of the signal at both ends of the waveguide which requires complex electronics.

In U.S. Pat. No. 5,724,126, Nishi et al. describe a method and apparatus for measuring a distribution of zero-dispersion wavelengths. In this method and apparatus an optical pulse and a pump signal are launched into an optical fiber and the amplification of the pulse signal resulting from modulation instability induced by the pump signal is detected from the back-scattered light waveform of the pulse signal. Advantageously, the apparatus and method proposed by Nishi et al. only requires measurements at one end of the optical fiber. Disadvantageously, the apparatus and method proposed by Nishi et al. does not provide information regarding group delay and/or wavelength dependence of the dispersion.

SUMMARY OF THE INVENTION

It is an object of the instant invention to provide a novel method and apparatus for measuring group delay and/or chromatic dispersion.

According to the invention, a modulated pump signal and a probe signal are propagated through a waveguide medium and the ratio of the modulation power of the pump signal to the modulation power of the output signal is determined and related to the chromatic dispersion.

The Raman gain varies along the fiber spatially and temporally due to the modulated pump signal. These variations get transferred to the probe signal. The efficiency of the transfer between the pump modulation and the probe modulation at the output of the waveguide depends on the difference in group velocity of the signals, which relates to the chromatic dispersion between the two wavelengths. The amplitude of both signal modulations are measured and related to the dispersion.

In one embodiment the probe signal is provided by a tunable laser diode. In another embodiment, the probe signal corresponds to amplified spontaneous emission generated by the modulated pump signal due to spontaneous Raman scattering in the fiber.

According to the present invention, there is provided a method of measuring group delay in an optical waveguide, the method comprising the steps of: a) providing a modulated pump signal to the optical waveguide; b) allowing the pump signal to propagate within the optical waveguide so as to generate gain within the waveguide, the gain having the modulation of the pump signal impressed thereon; c) varying the modulation frequency of the pump signal; d) measuring a frequency response of the modulated gain while the modulation frequency of the pump signal is varied; and determining the group delay from the frequency response of the modulated gain.

According to the present invention, there is provided a method for measuring chromatic dispersion of an optical waveguide having an input end and an output end, the method comprising the steps of: a) inputting a modulated pump signal into the input end of the waveguide to generate Raman gain in the waveguide, b) inputting a probe signal into the input end of the waveguide, the probe signal having a wavelength that is within Raman gain band characteristic of the waveguide, c) combining the pump signal and the probe signal at the input end of the waveguide, d) impressing the modulation of the pump signal on the probe signal through temporal and spatial Raman gain modulation in the waveguide, e) varying the modulation frequency of the pump signal, f) measuring frequency response of the probe signal at the output end of the waveguide while the modulation frequency of the pump signal is varied, g) determining the group delay from the frequency response of the probe signal, h) varying the wavelength of the probe signal, i) repeating steps a) to g) for different probe wavelengths to determine a relationship of group delay and wavelength, and j) determining the chromatic dispersion of the waveguide from said relationship.

In accordance with another aspect of the invention, there is provided an apparatus for measuring chromatic dispersion of a waveguide having an input end and an output end, the apparatus comprising: a Raman pump source operatively coupled to the input end of the waveguide, the Raman pump source for providing a pump signal to the input end; a modulator coupled to the Raman pump source, the modulator for modulating the Raman pump signal; and, a detector operatively coupled to the output end of the waveguide, the detector for measuring, at the output end of the waveguide, a frequency response of a probe signal simultaneously propagating through the waveguide with the modulated Raman pump signal.

The apparatus may further comprise combining means for combining the pump signal and a probe signal at the input end of the waveguide, and means for separating the pump signal and the probe signal at the output end of the waveguide.

The modulator may be an external intensity modulator operatively connected to the pump signal source. It may be embodied by an electrical modulator or by an optical modulator.

BRIEF DESCRIPTION OF THE DRAWINGS

Further features and advantages of the present invention will become apparent from the following detailed description, taken in conjunction with the appended drawings, in which.

It will be noted that throughout the appended drawings, like features are identified by like reference numerals.

DETAILED DESCRIPTION

The instant invention relates to an apparatus and method for measuring chromatic dispersion using Raman scattering. Raman scattering is a non-linear process that occurs when a high energy pump photon excites a molecule within a "gain medium" into a higher energy state, i.e., virtual level, which subsequently decays to a lower level by emitting another photon within the "gain spectrum" of the molecule.

When the decay occurs naturally, the emitted photon is scattered with random time, frequency, and polarization, and the process is referred to as Spontaneous Raman scattering. If, however, a signal photon within the "gain spectrum" collides with the excited molecule, then the emitted photon is scattered with the same frequency, phase, and polarization of the signal photon and the process is referred to as Stimulated Raman scattering. Amplified spontaneous emission (ASE) is the process in which the scattered photons from the spontaneous process induces stimulated Raman scattering.

Figure 1:
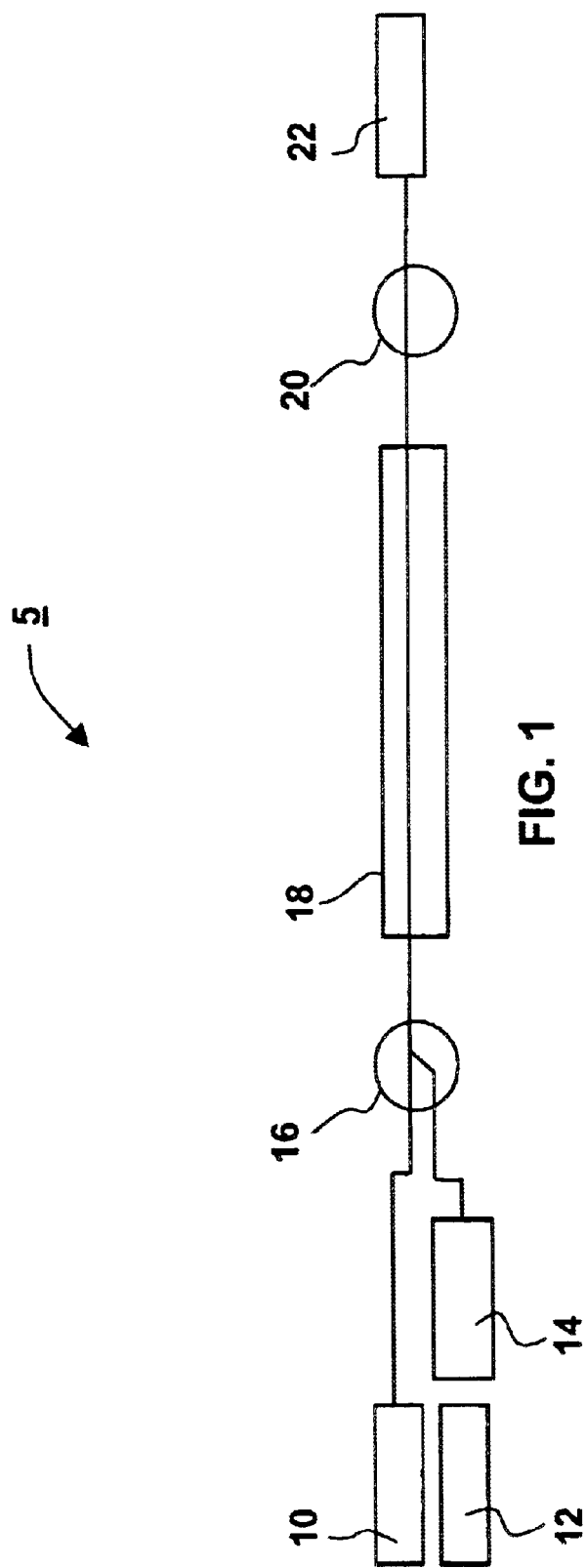
FIG. 1 is a block diagram of an apparatus for measuring chromatic dispersion according to one embodiment of the invention.

Referring to FIG. 1, there is shown a schematic diagram of an apparatus 5 for measuring chromatic dispersion in accordance with one embodiment of the instant invention. The apparatus 5 includes a probe laser 10 that provides a continuous signal at the wavelength(s) at which chromatic dispersion is to be measured, a pump laser 12 that provides a continuous signal at the desired Raman pumping wavelength, and a modulator 14 coupled to the pump laser that intensity or amplitude modulates the pump signal emitted by the pump laser 12.

Since the apparatus (and the method) preferably operate in the Stokes regime (in which pumping energy is passed to the probe signal), the pumping wavelength is typically of higher energy and therefore of shorter wavelength than the probe laser wavelength. The pump wavelength used is determined by the media under test. Usually, for silica glass, it is desired to have the central wavelength of the probe band to be about 13.2 THz lower than the pump wavelength. Since relatively little gain is needed in the measurement of chromatic dispersion and the Raman gain curve spans a relatively wide wavelength range, a single pump laser should be sufficient for each communication band (L, C, S, corresponding to 1565–1620 nm, 1525–1565 nm and 1450 nm to 1520 nm etc).

The apparatus 5 also includes a multiplexer 16 that combines the pump signal and the probe signal. The combined signal is input to a waveguide 18. Preferably, the waveguide 18 has a length that is sufficient to provide measurable chromatic dispersion. For example, in one embodiment the waveguide is a single-mode optical fiber that is at least one kilometer long. Due to the inherent nonlinear properties of the waveguide 18, some coupling takes place between the pump signal and the probe signal in the waveguide. In particular, as the two beams propagate through the waveguide 18 they experience stimulated Raman scattering, and as result the probe signal is amplified. The modulation of the pump signal causes the amount of gain to vary spatially along the waveguide. The combined signal is separated in a demultiplexer 20 back into the pump signal and the probe signal. The latter is presented to a detector 22. Using known parameters of the waveguide and modulation strength, the dispersion is calculated using the power detected at the given modulation frequency (i.e., the frequency response).

The normalized frequency response $H(\omega)$, obtained from scanning the modulation frequency of the pump and detecting the modulation transfer to the signal, resembles the response of a low-pass filter and is characterized by the following equation:

$$H(\omega) = \frac{1}{1 + \left(\frac{\omega\tau}{\alpha_p L}\right)^2} \frac{(1 - 2e^{-\alpha_p L}\cos(\omega\tau) + e^{-2\alpha_p L})}{(1 - e^{-\alpha_p L})^2} \quad (1)$$

where $\tau$ is the relative group delay, $\alpha_p$ is the fiber loss per unit length at the pump wavelength, $\omega$ equals $2\pi f$ where f is modulation frequency of a pump, and L is the length of the fiber.

Fitting the normalized frequency response obtained experimentally to equation (1) results in the determination of parameter $\tau$ for a particular probe wavelength. The measurement of chromatic dispersion requires the determination of $\tau(\lambda)$ for a sequence of wavelengths.

The dispersion $D(\lambda_s)$ can then be determined by using the following equation $$D(\lambda_s) = \frac{1}{L} \cdot \frac{d\tau(\lambda)}{d\lambda}\bigg|_{\lambda=\lambda_s} \quad (2)$$

where $\lambda_s$ is the wavelength of the probe being used.

Figure 2:
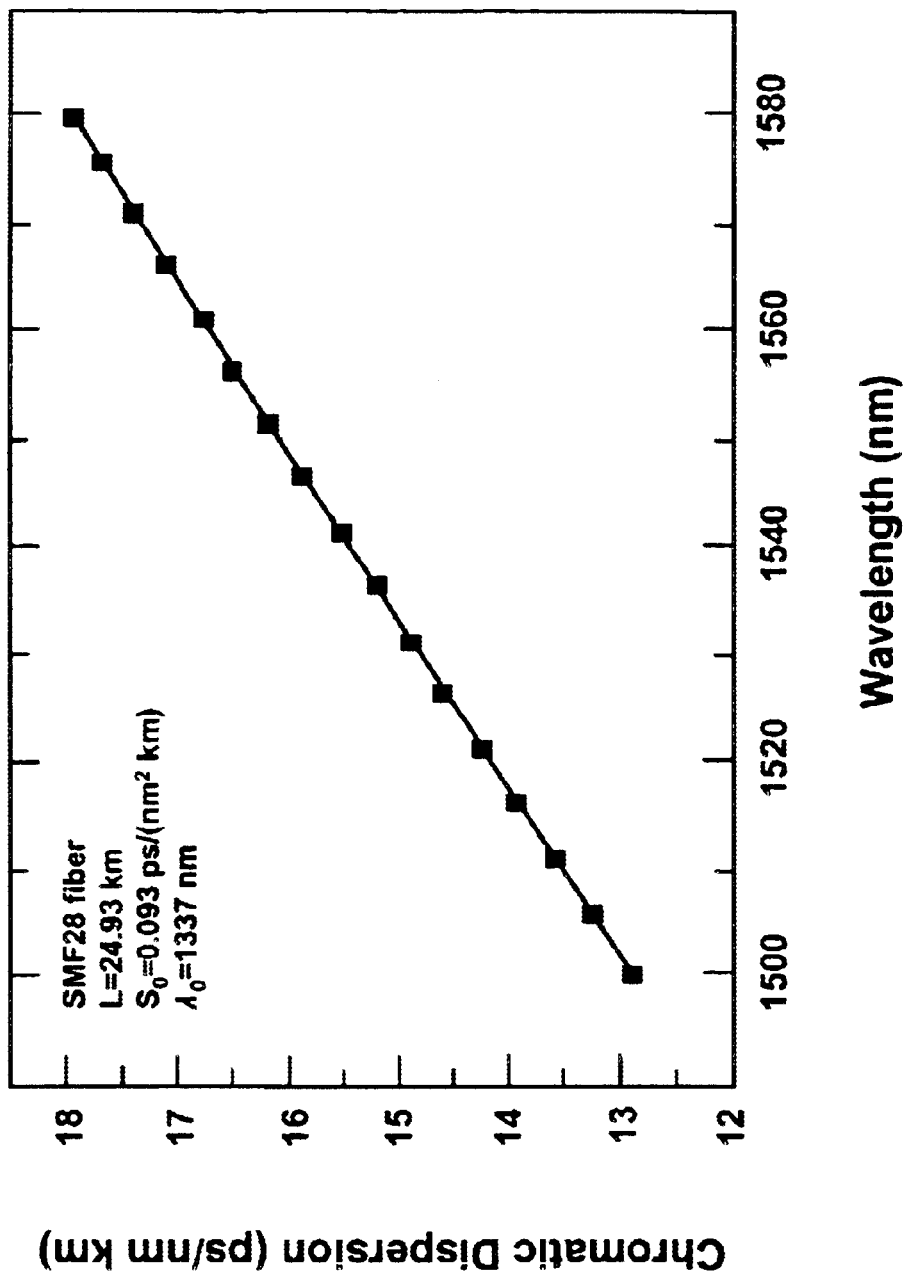
FIG. 2 is a graph illustrating relationship between experimental values and the theoretical values of chromatic dispersion.

FIG. 2 represents a relationship between experimental data of chromatic dispersion (squares) and the theoretical values (line). It can be seen that the relationship (fit) is very good.

Better results are achieved if $\tau$, the experimental group delay, is made to fit the Sellmeier's equation (3) before using equation (2) which smoothes the data before taking the derivative, thus reducing the noise.

$$\tau = a\lambda^2 + b + c\lambda^{-2} \quad (3)$$

In Equation (3) a, b and c are parameters determined by fitting experimental data to Sellmeier's equation. The chromatic dispersion can be derived from Eq. (3) by using equation (2).

Figure 3:
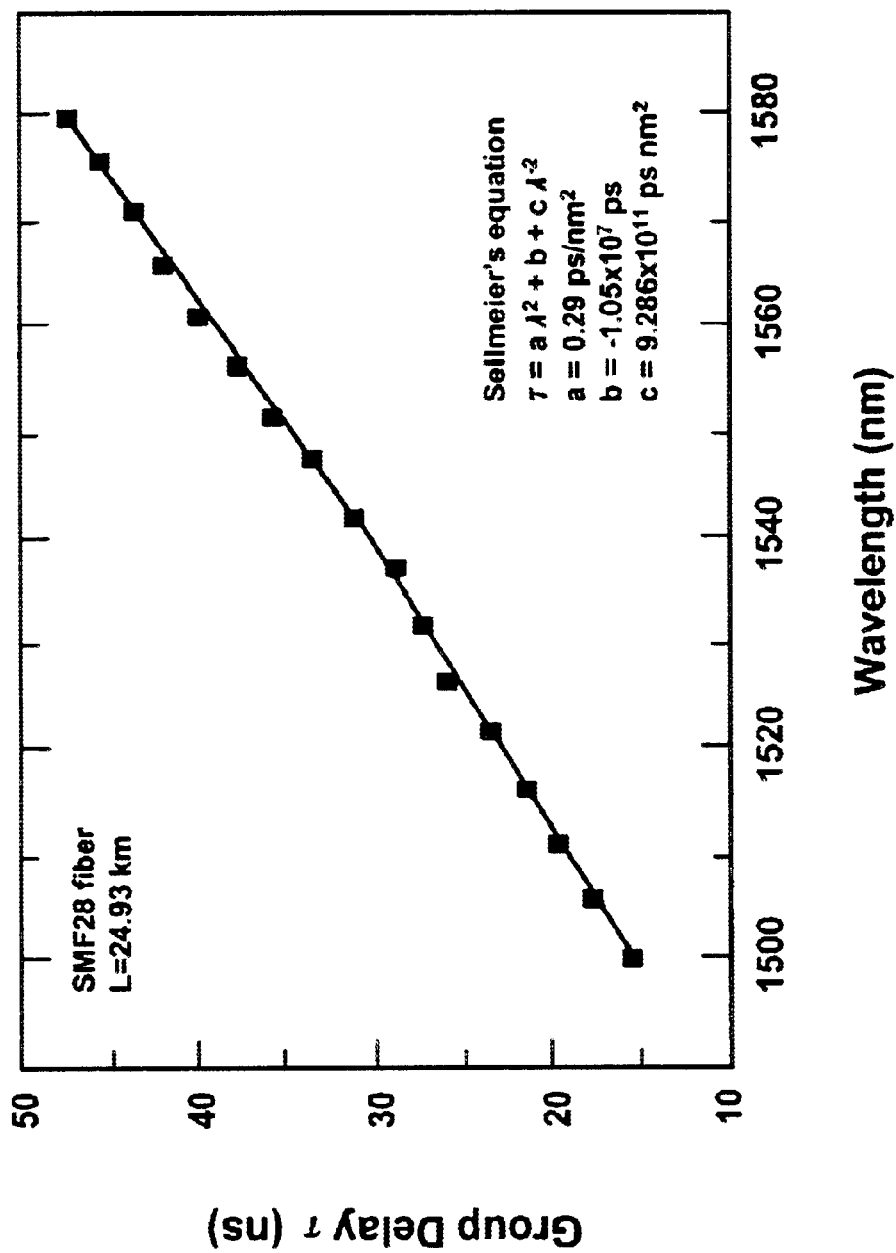
FIG. 3 is a graph of experimental group delay vs. wavelength based on Sellmeier's equation.

The results obtained using the iterative approach with the combination of Sellmeier's equation are presented in FIG. 3. It can be seen in FIG. 3 that the relationship between the group delay and the wavelength corresponds well to the Sellmeier's equation with parameters a, b and c as shown in the FIG. 3.

Advantageously, the instant invention provides an apparatus for determining group delay and/or chromatic dispersion, that is relatively simple and inexpensive.

For example, in one embodiment, the probe laser 10 is a tunable laser diode that provides a 6 mW signal beam and that scans between 1500–1580 nm, the pump laser 12 is a grating stabilized laser diode that provides a 130 mW signal beam at 1447 nm, the modulator 14 is an external modulator designed to sinusoidally amplitude modulate the pump signal as the modulation frequency is swept through a range of 300 kHz to 150 MHz, the waveguide 18 is a 24 km single-mode optical fiber, and the detector 22 includes a photodiode, a transimpedance amplifier and a tunable bandpass filter at the frequency of modulation, followed by an amplitude detector to detect the signal power at the modulation frequency.

In other embodiments, the probe laser 10 includes a broadband light source coupled to a monochromator or optical tunable filter, and/or the modulator includes an RF network analyzer having an input coupled to the detector 22 and an output connected to the pump laser 12. In embodiments including an optical tunable filter, the filter is optionally positioned upstream or downstream from the optical waveguide 18. In the latter case, the optical tunable filter optionally replaces the demultiplexor 20.

In summary, the method and apparatus described above enables the determination of chromatic dispersion in a waveguide by using spatial and temporal Raman gain modulation. The Raman effect gives rise to a transfer of modulation from the pump signal to the probe signal. The efficiency of the transfer is controlled by the dispersion. Dispersion can thus be determined from this relationship.

Figure 4:
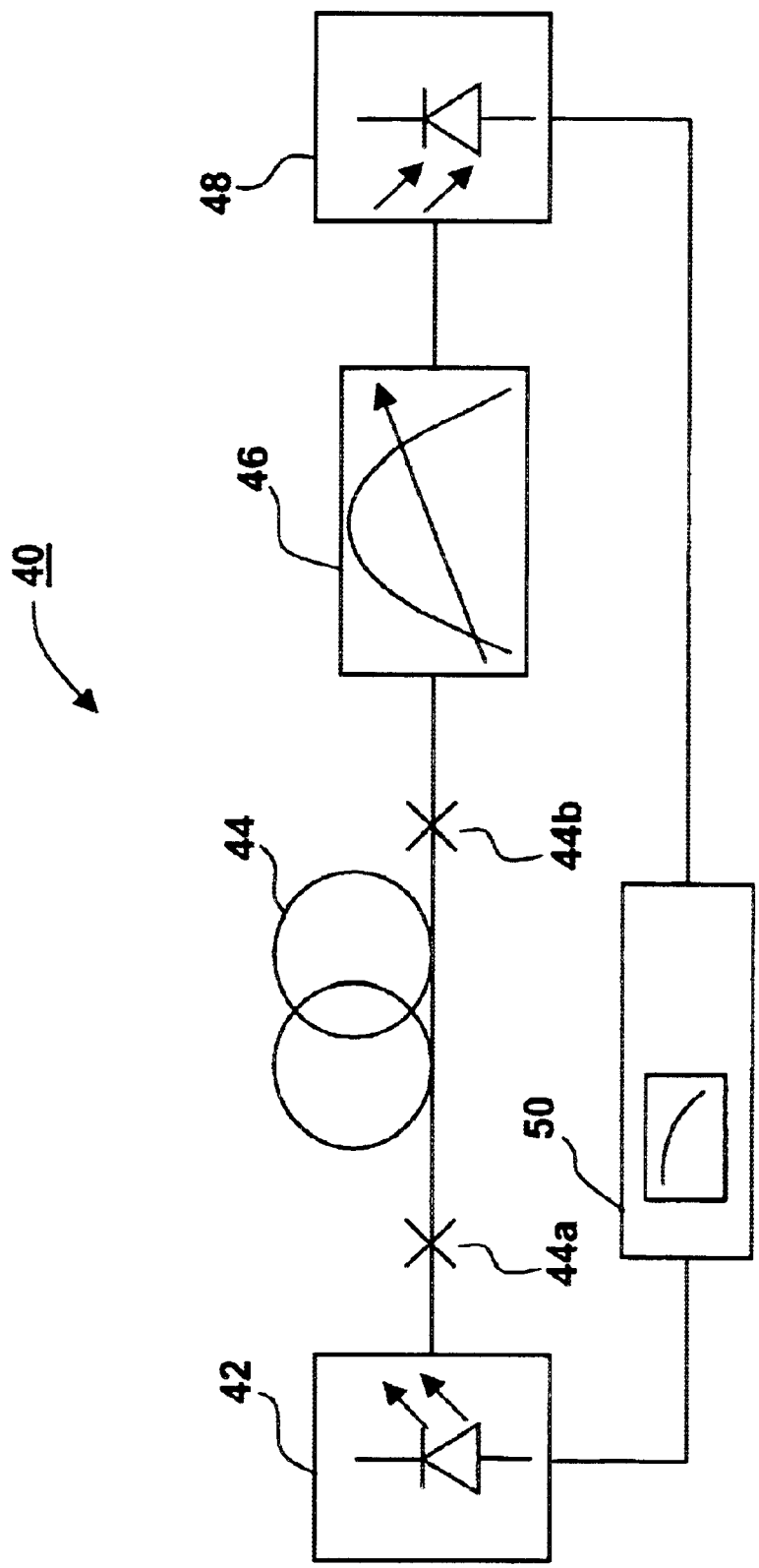
FIG. 4 is a block diagram of an apparatus for measuring chromatic dispersion according to another embodiment of the invention.

Referring to FIG. 4, there is shown an apparatus 40 for measuring chromatic dispersion in accordance with another embodiment of the instant invention. In this embodiment, the probe signal is not provided by a tunable laser diode, but rather corresponds to the ASE generated from the pump signal.

The apparatus 40 includes a pump laser 42, an optical waveguide 44, a tunable optical filter 46, and a detector 48. The optical waveguide 44, which for exemplary purposes is illustrated as an optical fibre, has an input end coupled to the pump laser 42 and an output end coupled to the tunable filter 46. Each end of the optical fiber 44 is connected via a splice or connector 44a, 44b. Alternatively, the optical fiber 44 is connected to the pump laser 42 and/or tunable filter 46 in another manner, such as with a wavelength division multiplexer (WDM).

The apparatus 40 also includes a modulator 50 for modulating the pump signal. For exemplary purposes, the modulator 40 is depicted as a network analyzer that is coupled to both the detector 48 and the pump laser 42. In particular, an output of the detector 48 is coupled to an input of the network analyzer 50, while the output of the network analyzer is coupled to an input of the pump laser 42. The network analyzer is used to sweep the frequency of modulation of the pump signal and record the magnitude of the frequency coming out of the detector 48.

In one embodiment, the optical fiber 44 is a single-mode optical fiber, the pump laser 42 is a grating stabilized laser diode emitting at 1447 nm, the tunable filter 46 is a narrow-bandpass filter, and the detector is a photo-diode. Preferably, the detector 48 is sufficiently sensitive to detect ASE. For example, in one embodiment the detector 48 includes both a photo-diode and an erbium doped fiber amplifier (EDFA). Of course other modifications are also within the scope of the invention. For example, in one embodiment the network analyzer is replaced with an external modulator coupled to the pump laser 42 and the detector 48 is designed to include an electric filter or lock-in (LI) amplifier to determine the amplitude of the transferred modulation.

In operation, the pump laser 42 provides a continuous pump signal that is modulated by the network analyzer 50. For example, in one embodiment the pump signal is sinusoidally modulated at 300 kHz. The modulated pump signal propagates through the optical fiber 44. Wherever the pump signal interacts with the fiber 44, both stimulated and spontaneous Raman scattering occurs, the strongest effects occurring at the input of the optical fiber (i.e., near 44a). The ASE generated by these processes propagates through the optical fiber 44 with the pump signal. As the ASE and the pump signal propagate through the optical fiber 44, some more coupling occurs, and modulation from the intense pump signal is transferred to the lower intensity ASE signal. In other words, since the pump is modulated the ASE varies both spatially and temporally. Notably, the ASE is a broad wavelength signal covering the entire Raman gain spectrum that is very small in intensity and does not substantially affect the pump signal. When the modulated ASE and pump signals are output from the optical fiber 44, they are transmitted to the tunable optical filter 46. The tunable filter 46 filters out all wavelengths, including the pump wavelength, from the wavelength or wavelength range of interest. The resulting narrow-band modulated signal is output the tunable filter 46 and the amplitude of the modulation is measured by the detector 48 and/or network analyzer 50. In particular, the ratio of the modulation power of the pump to the modulation power of the ASE, normalized to 1 at the peak, i.e., the normalized frequency response or transfer function, is calculated. This process is repeated as the modulator 50 is swept through a predetermined frequency range, which for example is from 300 kKz to 150 MHz. The experiment curve corresponding to a plot of the transfer function versus the modulation frequency is used with Equation 1 to calculate $\tau$, the wavelength dependent relative group delay between the ASE and the pump signal. Notably, $\tau$ is calculated at the wavelength of the tunable optical filter 46. To calculate the dispersion of the optical fiber 44, $D(\lambda)$, the entire process is repeated for selected wavelengths as the tunable filter 46 is swept through a predetermined wavelength range, for example from 1500–1580 nm. The dispersion is calculated from Equation 2, as discussed above.

Advantageously, the instant invention obviates the use of pulses and/or phase detectors, thus lowering the cost and complexity, relative to the prior art. Moreover, in each of the described embodiments, the chromatic dispersion occurs in the same optical waveguide and at the same time that the Raman gain occurs.

Since the pump source (transmitter) does not need to be physically connected to the detector (receiver) except by the device under test (DUT), the method and apparatus in accordance with the instant invention allows measurements to be made at only one end of the DUT (i.e., the modulation transferred to the probe/ASE signal is compared to the known modulation injected into the pump signal).

Notably, the apparatus and method discussed with respect to FIG. 4 generates its own probe signal, thus eliminating the need for a tunable laser and further simplifying the design. Of course, it is also possible to use a continuous wave broadband probe source in the embodiment illustrated in FIG. 4, to lessen the burden on the detection system and still obviate the need for a tunable laser.

The embodiments of the invention described above are intended to be exemplary only. The scope of the invention is therefore intended to be limited solely by the scope of the appended claims.

We claim:

1. A method of measuring group delay in an optical waveguide, the method comprising the steps of:
    a) providing a modulated pump signal to the optical waveguide;
    b) allowing the pump signal to propagate within the optical waveguide so as to generate gain within the waveguide, the gain having the modulation of the pump signal impressed thereon;
    c) varying the modulation frequency of the pump signal;
    d) measuring a frequency response of the modulated gain while the modulation frequency of the pump signal is varied; and
    e) determining the group delay from the frequency response of the modulated gain.

2. The method of claim 1 comprising the step of separating the modulated gain from the pump signal prior to step d).

3. The method of claim 1 wherein the step of determining the group delay comprises using the equation $$H(\omega) = \frac{1}{1+\left(\frac{\omega\tau}{\alpha_p L}\right)^2} \frac{(1 - 2e^{-\alpha_p L}\cos(\omega\tau) + e^{-2\alpha_p L})}{(1 - e^{-\alpha_p L})^2}$$

where $\tau$ is the relative group delay between the pump and the gain, $\alpha_p$ is the fiber loss per unit length at the pump wavelength, $\omega$ equals $2\pi f$ where f is modulation frequency of a pump, and L is the length of the fiber.

4. The method of claim 1 wherein the step of measuring the frequency response comprises measuring the frequency response at a predetermined wavelength.

5. The method of claim 4 further comprising the steps of:
    f) varying the predetermined wavelength;
    g) repeating steps a) to e) for different predetermined wavelengths to determine a relationship of group delay and wavelength, and
    h) determining the chromatic dispersion of the waveguide from said relationship.

6. The method of claim 5 wherein the relationship is fit to Sellmeier's equation $$\tau = a\lambda^2 + b + c\lambda^{-2}$$

where a, b and c are parameters determined by fitting experimental data to the equation, to determine the chromatic dispersion.

7. The method of claim 5 wherein the step of varying the predetermined wavelength comprises at least one of varying the output wavelength of a tunable laser, varying the wavelength of a tunable filter, and varying the output of a monochromator.

8. The method of claim 5 wherein step b) comprises generating Raman gain within the waveguide corresponding to at least one of ASE and an amplified probe signal.

9. A method for measuring chromatic dispersion of an optical waveguide having an input end and an output end, the method comprising the steps of:
    a) inputting a modulated pump signal into the input end of the waveguide to generate Raman gain in the waveguide,
    b) inputting a probe signal into the input end of the waveguide, the probe signal having a wavelength that is within Raman gain band characteristic of the waveguide,
    c) combining the pump signal and the probe signal at the input end of the waveguide,
    d) impressing the modulation of the pump signal on the probe signal through temporal and spatial Raman gain modulation in the waveguide,
    e) varying the modulation frequency of the pump signal,
    f) measuring frequency response of the probe signal at the output end of the waveguide while the modulation frequency of the pump signal is varied,
    g) determining the group delay from the frequency response of the probe signal,
    h) varying the wavelength of the probe signal,
    i) repeating steps a) to g) for different probe wavelengths to determine a relationship of group delay and wavelength, and
    j) determining the chromatic dispersion of the waveguide from said relationship.

10. An apparatus for measuring group delay of a waveguide having an input end and an output end, the apparatus comprising:

a Raman pump source operatively coupled to the input end of the waveguide, the Raman pump source for providing a pump signal to the input end;

a modulator coupled to the Raman pump source, the modulator for modulating the Raman pump signal; and, a detector operatively coupled to the output end of the waveguide, the detector for measuring, at the output end of the waveguide, a frequency response of a probe signal simultaneously propagating through the waveguide with the modulated Raman pump signal means for determining the group delay from the frequency response of the probe signal.

11. The apparatus of claim 10 comprising a probe source operatively coupled to the input end of the waveguide, the probe source for launching the probe signal into the input end of the waveguide.

12. The apparatus of claim 11 wherein the probe source comprises a tunable laser for generating a continuous probe signal.

13. The apparatus of claim 11 comprising combining means for combining the pump signal and the probe signal at the input end of the waveguide.

14. The apparatus of claim 11 comprising means for separating the modulated pump signal from the probe signal at the output end of the waveguide.

15. The apparatus of claim 10 wherein the modulator is an external intensity modulator operatively connected to the Raman pump source.

16. The apparatus of claim 10 wherein the modulator comprises an electrical modulator.

17. The apparatus of claim 10 wherein the modulator comprises an optical modulator.

18. The apparatus of claim 10 comprising a tunable optical filter operatively coupled to the output end of the waveguide, the tunable filter for selecting a predetermined wavelength for which group delay will be determined.

19. The apparatus of claim 18 wherein the probe signal comprises ASE generated by the pump signal within the optical waveguide.

20. The apparatus of claim 10 wherein the probe signal comprises ASE generated by the pump signal within the optical waveguide.

* * * * *

UNITED STATES PATENT AND TRADEMARK OFFICE
CERTIFICATE OF CORRECTION

PATENT NO. : 6,801,308 B2
DATED : October 5, 2004
INVENTOR(S) : Martin Achtenhagen et al.

It is certified that error appears in the above-identified patent and that said Letters Patent is hereby corrected as shown below:

Title page,
Item [73], Assignee, please delete ", Inc." and change to -- Corporation --

Signed and Sealed this

Nineteenth Day of April, 2005

JON W. DUDAS
*Director of the United States Patent and Trademark Office*